Jan. 28, 1930.  A. L. SWANK  1,744,932
RADIATOR
Filed Dec. 22, 1924

Inventor
Arthur L. Swank

By *[signature]*

Attorneys

Patented Jan. 28, 1930

1,744,932

UNITED STATES PATENT OFFICE

ARTHUR L. SWANK, OF DETROIT, MICHIGAN, ASSIGNOR TO LONG MANUFACTURING COMPANY, OF DETROIT, MICHIGAN, A CORPORATION OF MICHIGAN

RADIATOR

Application filed December 22, 1924. Serial No. 757,536.

The invention relates to radiator constructions particularly for motor vehicles and has special reference to a method of attaching the tubes to the header plates. Among the objects of the invention is the provision of a method for quickly attaching tubes to radiator header plates resulting in a strong and durable radiator construction. A further object is the provision of means affording a greater contact between the tubes and the header plates than heretofore, whereby the soldering of these parts is facilitated.

With these and other objects in view, the invention resides in the novel features of construction and combination and arrangements of parts as more fully hereinafter described and claimed.

Referring to the drawings:

Figure 1 indicates a plan of a fragment of a radiator core showing one form of my invention;

Figure 1:
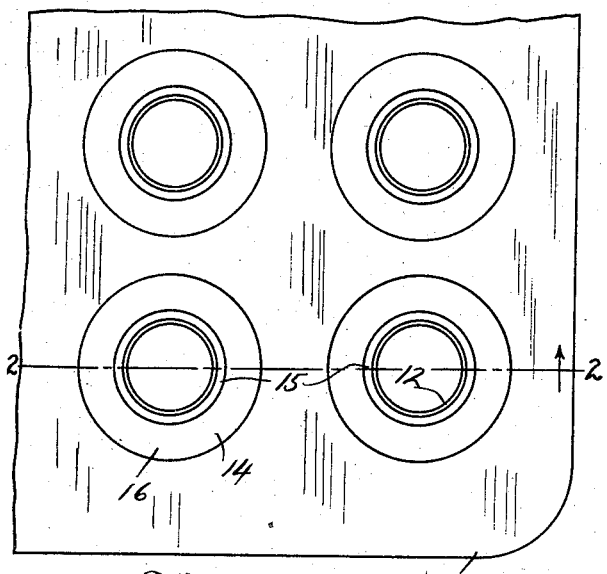

In the drawings reference character 10 indicates one of the tube sheets of a radiator ordinarily formed with the inwardly punched openings forming flanges 11 for receiving and positioning the tubes 12. 13 represents the usual cooling vanes for the tubes.

Heretofore the tubes 12 were soldered to the tube sheets 10 at the engagement afforded by the inwardly directed flanges 11. Such construction results in a weak core, the tubes being unsuppported above the tube sheets.

My invention includes the addition of stamped thimbles or ferrules 14 formed with upwardly directed flanges 15 for engaging the tubes 12 for a distance above the tube sheets forming, in effect, with the flanges 11 a longer engagement surface of contact for soldering and reinforcing engagement with the tubes. The ferrules 14 may be provided with the horizontal flanges 16 adapted to be soldered to the tube sheet.

It will thus be noted that I have provided a method of forming a radiator including the steps of inwardly flanging the tube sheets, attaching the tubes thereto, applying the ferrules provided with the upwardly flanged openings engaging the tubes and soldering the joints. Such a method may be cheaply and simply performed and results in a radiator core which is very rigid and leak proof.

Figure 3:
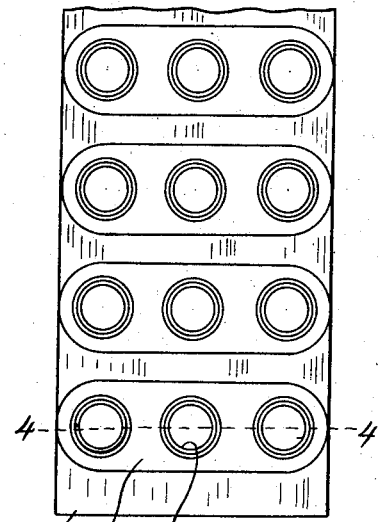
Figure 3 is a plan of a radiator core illustrating another form of my invention.
Figure 2:
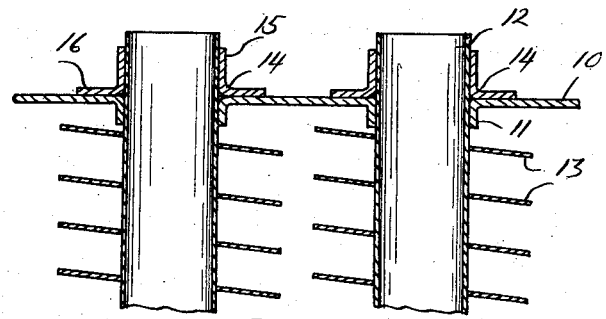
Figure 2 is a section along the line 2—2 of Figure 1.
Figure 4:
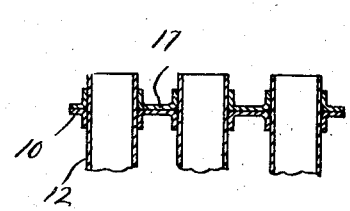
Figure 4 is a section along the line 4—4 of Figure 3.

Instead of forming the ferrules individually for the respective tubes, I may form them in groups having flanges stamped from a single piece of metal to engage any number or all of the tubes. Such an arrangement is illustrated in Figure 3 in which metal ferrule strips 17 are shown provided with a plurality of spaced upwardly flanged openings for engaging a row of tubes. Such construction affords a more speedy application of the reinforcing means since a plurality of tubes are embraced upon application of a single member 17.

If desired, all of the tubes could be embraced by the addition of a single member formed with openings flanged to receive all of the tubes. The forms illustrated are preferable, for example, in saving metal.

While it is believed that from the foregoing description, the nature and advantage of my invention will be readily understood, I desire to have it understood, that I do not limit myself to what is herein shown and described and that such changes may be resorted to when desired as fall within the scope of the claim.

What I claim as my invention is:—

In a motor vehicle radiator, the combination with a tank and a thin-walled hollow pipe communicating therewith, of means for reinforcingly securing the pipe end and tank together, the wall of said tank being apertured to receive the pipe end and having an integral collar struck up around the aperture for embracing the pipe snugly, and a reinforcing member lying flat against and affixed tightly to the side of the tank wall opposite from said collar, said reinforcing member having an integral flange portion for snugly embracing the pipe, which portion faces in a direction opposite from the direction said collar faces, and said collar and flange being tightly and rigidly united with said pipe.

In testimony whereof I affix my signature.
ARTHUR L. SWANK.